US012673438B2

(12) United States Patent
Zhang et al.

(10) Patent No.: US 12,673,438 B2
(45) Date of Patent: Jul. 7, 2026

(54) BLADESET FOR A HAIR CUTTING APPARATUS WITH TAPERED TEETH

(71) Applicant: WAHL CLIPPER CORPORATION, Sterling, IL (US)

(72) Inventors: Sam Xueyi Zhang, Sterling, IL (US); Jason William Wagner, Sterling, IL (US)

(73) Assignee: WAHL CLIPPER CORPORATION, Sterling, IL (US)

( * ) Notice: Subject to any disclaimer, the term of this patent is extended or adjusted under 35 U.S.C. 154(b) by 285 days.

(21) Appl. No.: 18/482,253

(22) Filed: Oct. 6, 2023

(65) Prior Publication Data

US 2025/0114957 A1 Apr. 10, 2025

(51) Int. Cl.
*B26B 19/38* (2006.01)
*B26B 19/06* (2006.01)

(52) U.S. Cl.
CPC .......... *B26B 19/3846* (2013.01); *B26B 19/06* (2013.01)

(58) Field of Classification Search
CPC ............................ B26B 19/06; B26B 19/3846
See application file for complete search history.

(56) References Cited

U.S. PATENT DOCUMENTS

| | | | |
|---|---|---|---|
| 1,646,470 A | 10/1927 | Wright et al. | |
| 1,780,276 A | 11/1930 | Scheiwer | |
| 1,791,228 A | 2/1931 | Scheiwer | |
| 1,908,385 A | 5/1933 | Wahl | |
| 1,939,253 A | 12/1933 | Dremel | |
| 2,035,632 A | 3/1936 | Andis | |
| 2,101,737 A | 12/1937 | Gesler | |
| 2,274,924 A * | 3/1942 | Hill | B26B 19/06 30/225 |
| 2,279,102 A | 4/1942 | Altemus | |
| 2,470,287 A | 5/1949 | Carter | |
| 2,579,676 A | 12/1951 | Kellog et al. | |
| 2,641,833 A | 6/1953 | Need | |
| 2,726,441 A | 12/1955 | Brody | |
| 2,738,579 A | 3/1956 | Gent | |
| 3,093,902 A | 6/1963 | Andis | |

(Continued)

FOREIGN PATENT DOCUMENTS

| | | |
|---|---|---|
| EP | 2138282 A1 | 12/2009 |
| EP | 2939802 B1 | 7/2019 |
| FR | 2411677 A1 | 7/1979 |

OTHER PUBLICATIONS

International Search Report and Written Opinion received for PCT/US2024/049384, mailed Jan. 3, 2025.

*Primary Examiner* — Liang Dong
(74) *Attorney, Agent, or Firm* — Greer Burns & Crain, Ltd

(57) ABSTRACT

A bladeset is operationally connected to a hair clipper and includes a stationary blade and a moving blade configured for reciprocating laterally relative to the stationary blade. At least one of the stationary blade and the moving blade includes a base and a plurality of teeth extending from the base. The plurality of teeth includes a set of long teeth, each of the long teeth having a tip parallel to and spaced a first distance from the base defining a first cutting line; and a set of short teeth, each of the short teeth having a tip parallel to and spaced a second distance from the base defining a second cutting line spaced apart from the first cutting line. The first cutting line is farther from the base than the second cutting line.

12 Claims, 9 Drawing Sheets

(56) References Cited

U.S. PATENT DOCUMENTS

| | | | |
|---|---|---|---|
| 3,161,954 | A | 12/1964 | Riley, Jr. et al. |
| 3,314,149 | A | 4/1967 | Kobler et al. |
| 3,711,948 | A | 1/1973 | Ford et al. |
| 4,020,549 | A | 5/1977 | Edwards |
| 4,118,863 | A | 10/1978 | Sandy |
| 4,152,830 | A | 5/1979 | Meijer et al. |
| 4,557,050 | A | 12/1985 | Haraguchi et al. |
| 4,782,592 | A | 11/1988 | Altamore |
| 4,825,546 | A | 5/1989 | Araki et al. |
| 5,068,966 | A | 12/1991 | Wahl et al. |
| 5,461,780 | A | 10/1995 | Morana |
| 5,600,890 | A | 2/1997 | Leitner et al. |
| 5,794,348 | A | 8/1998 | Scott |
| 5,933,964 | A | 8/1999 | Altamore |
| 5,964,037 | A | 10/1999 | Clark |
| 6,073,350 | A | 6/2000 | Elston et al. |
| 6,658,740 | B2 | 12/2003 | Habben |
| 6,973,855 | B2 | 12/2005 | Yanosaka et al. |
| 7,080,458 | B2 | 7/2006 | Andis |
| 7,841,091 | B2 | 11/2010 | Melton |
| 8,176,637 | B2 | 5/2012 | Fukutani et al. |
| 8,479,400 | B2 | 7/2013 | Fukutani et al. |
| 8,832,946 | B2 | 9/2014 | Howdeshell, II et al. |
| 9,027,252 | B2 | 5/2015 | Moseman |
| 10,252,429 | B2 | 4/2019 | Sablatschan et al. |
| 2004/0016128 | A1 | 1/2004 | Yanosaka et al. |
| 2006/0156549 | A1 | 7/2006 | O |
| 2007/0044320 | A1* | 3/2007 | Fukutani ............... B26B 19/205 30/201 |
| 2007/0214654 | A1 | 9/2007 | Chen et al. |
| 2012/0167395 | A1 | 7/2012 | Duffy et al. |
| 2012/0240415 | A1 | 9/2012 | Tringali et al. |
| 2014/0115901 | A1 | 5/2014 | Liao |
| 2021/0331338 | A1* | 10/2021 | Emminger .............. B26B 19/20 |
| 2023/0090687 | A1* | 3/2023 | Bushman ................ B26B 19/06 30/208 |
| 2023/0286182 | A1* | 9/2023 | Laschinski .......... B26B 19/3846 |
| 2023/0405854 | A1* | 12/2023 | Zhang ................. B26B 19/3846 |

* cited by examiner

BLADESET FOR A HAIR CUTTING APPARATUS WITH TAPERED TEETH

BACKGROUND

The present disclosure relates generally to electric or battery-operated hair cutting appliances such as hair clippers, hair trimmers, and more particularly, to a bladeset with tapered teeth for such devices.

Electric hair trimmers or clippers, collectively referred to here as clippers, are commonly used by stylists, barbers, animal groomers or individuals for styling hair, and typically include a handle having a housing for enclosing a motor and a blade assembly associated with the handle. The blade assembly is generally fixed to the handle at a certain orientation for receiving driving power from the motor.

A bladeset in the blade assembly includes a stationary blade and a moving blade reciprocating laterally and substantially parallel relative to the stationary blade to provide a scissors-type cutting action by way of the relative movement of teeth positioned along an edge of each of the moving and stationary blades. Each blade includes a plurality of forward projecting teeth that are spaced apart along a front blade edge that defines a cutting line. The individual geometry and relative spatial relationship of the projecting teeth optionally have a variety of forms, to achieve a variety of different hair cutting characteristics. Some tooth geometries and relationships are well suited for bulk removal of hair, while other geometries and relationships are better suited for finer work such as fading and blending.

For example, a stagger tooth bladeset, such as that seen in U.S. Pat. No. 7,841,091 to Melton, includes a moving blade with alternating long and short teeth. In such a stagger tooth blade, the teeth optionally exhibit uniform geometry, and optionally have blunted edges which are perpendicular to a longitudinal axis of the blade.

Accordingly, there is the need for a hair clipper bladeset which provides enhanced blending or tapering of hair.

SUMMARY

The above-listed need is met or exceeded by the present bladeset with tapered teeth. The present bladeset preferably includes at least one of a moving blade and a stationary blade with a first plurality of long teeth and a second plurality of short teeth arranged so that the short teeth alternate between the long teeth. One feature of a blade of the present bladeset is that tips of the long teeth of the blade have tapered edges, which are tapered at an angle α with respect to a straight line extending perpendicularly from a base of the blade. Alternatively, or additionally, the short teeth of the present blade include the tapered edges. Another feature of the present blade is that the height of the short teeth is preferably greater than a distance between the base and the bottom of the tapered edge of the long teeth.

The present blade is an improvement for blending or tapering hair, especially adjacent sharp "outlining" cuts. Specifically, the present blade reduces "fly away" hairs that escape traditional cutting blades by being close to the bladeset tips as the moving blade reciprocates relative to the stationary blade.

More specifically, the present bladeset is operationally connected to a hair clipper and includes a stationary blade and a moving blade configured for reciprocating laterally relative to the stationary blade. At least one of the stationary blade and the moving blade includes a base and a plurality of teeth extending from the base. The plurality of teeth includes a set of long teeth, each of the long teeth having a tip spaced a first distance from the base defining a first cutting line; and a set of short teeth, each of the short teeth having a tip spaced a second distance from the base defining a second cutting line spaced apart from the first cutting line. The first cutting line is farther from the base than the second cutting line.

Each of the long teeth include first and second cutting faces, such that at least one of the first and second cutting faces of the long teeth includes a first tapered edge having an end at the tip of the long teeth. Alternatively, or additionally, each of the short teeth include first and second cutting faces, such that at least one of the first and second cutting faces of the short teeth includes a second tapered edge having an end at the tip of the short teeth.

In a preferred embodiment, the first cutting face and the second cutting face of the long teeth each include the first tapered edge and extend transversely from the base.

In another preferred embodiment, consecutive long teeth of the set of the long teeth alternate which of the first cutting face and the second cutting face of the long teeth include the first tapered edge. Preferably, the first tapered edge extends at an angle α from the at least one of the first cutting face and the second cutting face of the long teeth, where the angle α is measured between a straight line extending perpendicularly from the base and the first tapered edge. Preferably still, the angle α is between 5 degrees and 25 degrees.

In yet another preferred embodiment, the first cutting face and the second cutting face of the short teeth each include the second tapered edge. Preferably still, the first cutting face and the second cutting face of the short teeth extend transversely from the base.

In preferred embodiments, consecutive short teeth of the set of short teeth alternate as to which of the first cutting face and the second cutting face of the second teeth include the second tapered edge, and the second tapered edge extends at an angle β from the at least one of the first cutting face and the second cutting face of the short teeth where the angle β is measured between a straight line extending perpendicularly from the base and the second tapered edge, such that the angle β is between 5 degrees and 25 degrees.

In yet another preferred embodiment, the second distance is larger than a distance between the bottom of the first tapered edge and the base.

The present disclosure also includes a hair clipper which includes a clipper housing defining a longitudinal axis and a cutting end, and a clipper bladeset operationally connected to the cutting end. The clipper bladeset includes a stationary blade and a moving blade configured for reciprocating laterally relative to the stationary blade, such that at least one of the stationary blade and the moving blade includes a base and a plurality of teeth extending from the base. The plurality of teeth includes a set of long teeth, each of the long tooth having a tip parallel to and spaced a first distance from the base defining a first cutting line, and a set of short teeth, each the short teeth having a tip parallel to and spaced a second distance from the base defining a second cutting line spaced apart from the first cutting line. The first cutting line is farther from the base than the second cutting line.

Each of the long teeth include first and second cutting faces, such that at least one of the first and second cutting faces of the long teeth includes a first tapered edge having an end at the tip of the long teeth. Alternatively, or additionally, each of the short teeth include first and second cutting faces, such that at least one of the first and second cutting faces of the short teeth includes a second tapered edge having an end at the tip of the short teeth.

DETAILED DESCRIPTION

Figure 1:
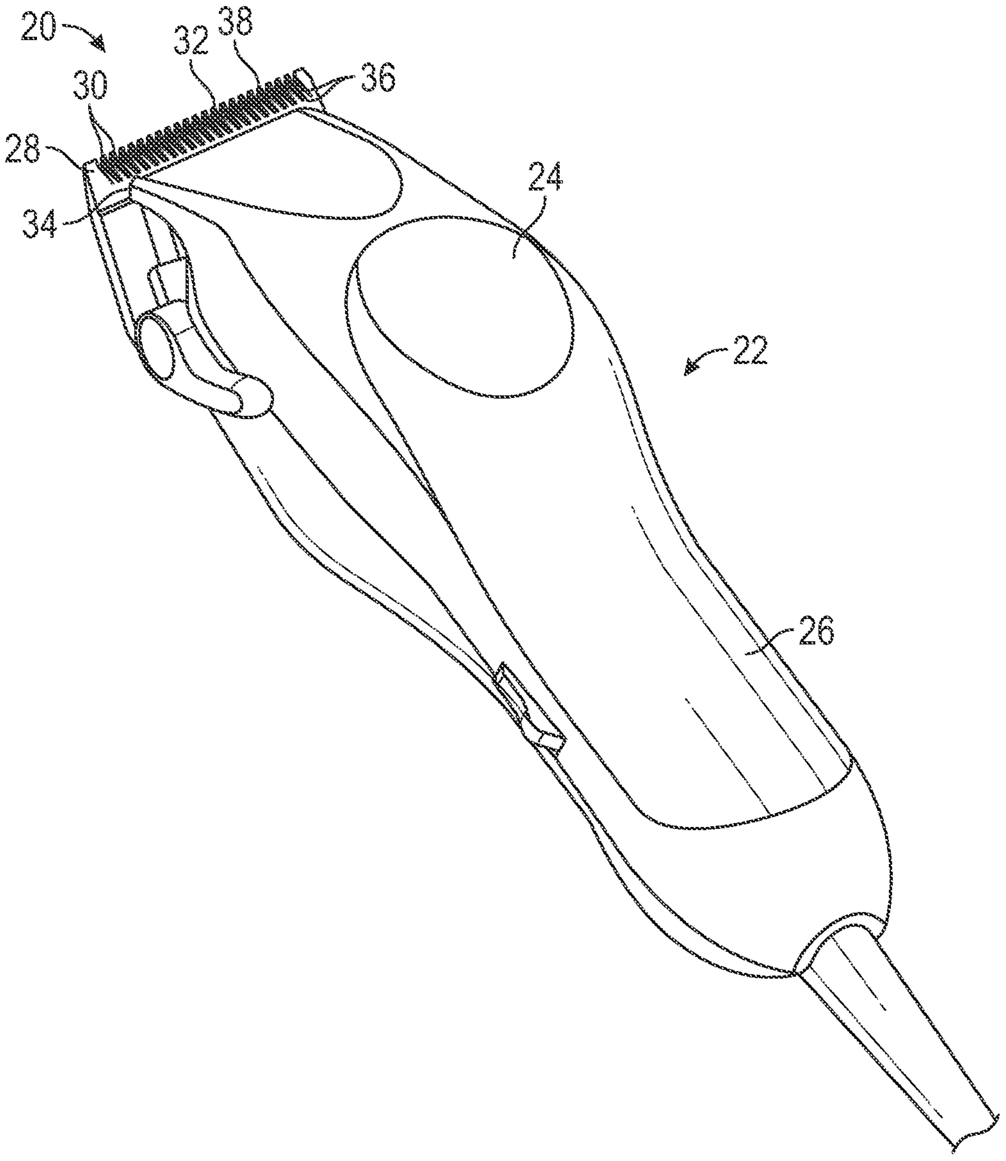
FIG. 1 is a top perspective of a hair clipper including an embodiment of the present bladeset.
Figure 2:
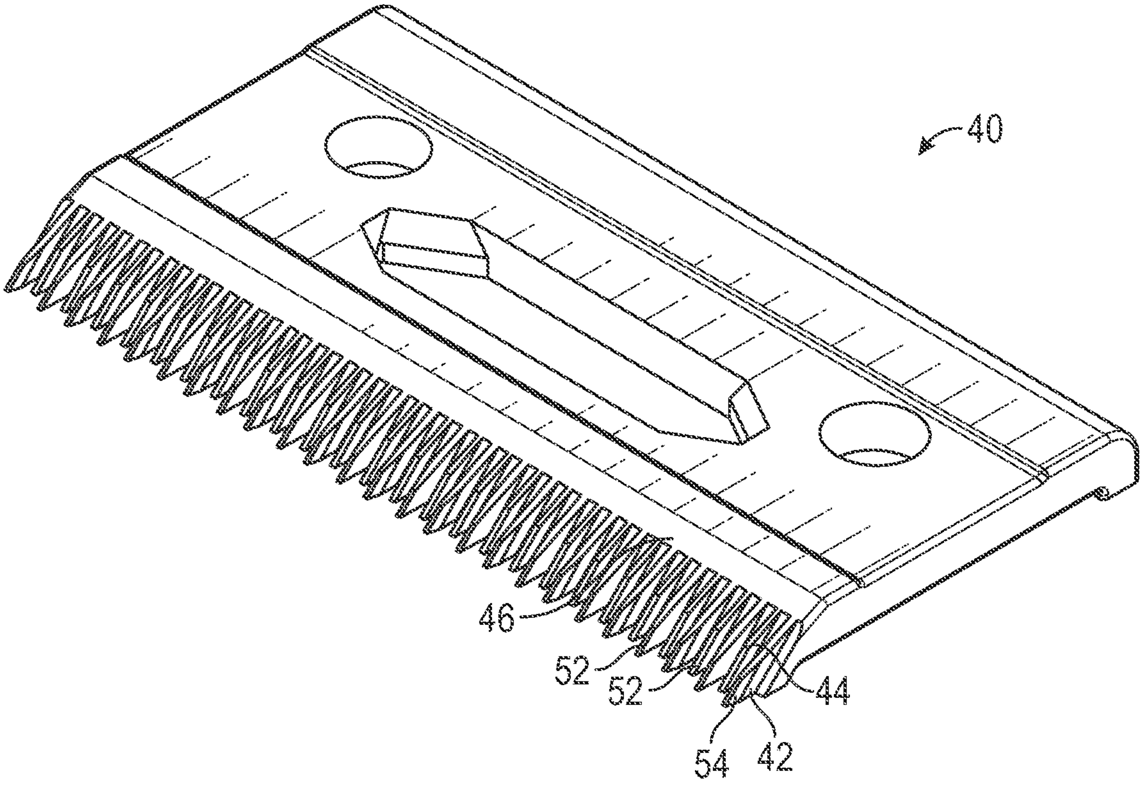
FIG. 2 is a top perspective view of an embodiment of a blade of the present bladeset.
Figure 3:
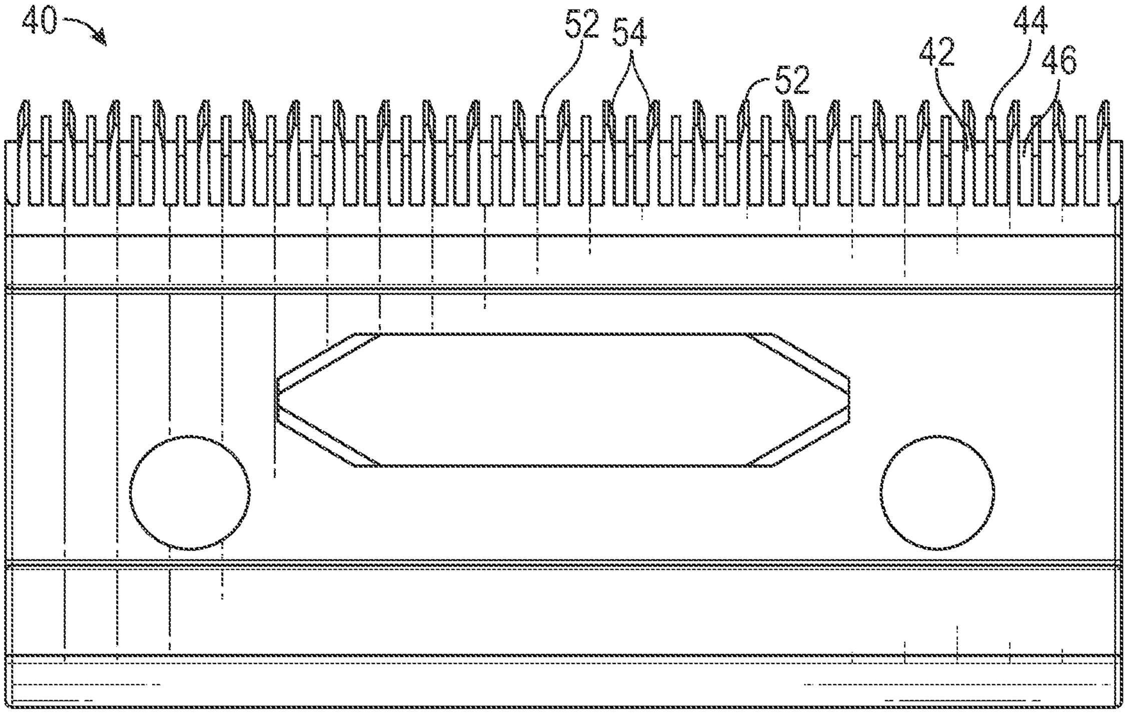
FIG. 3 is a top view of the blade of FIG. 2.

Referring to FIG. 1, a hair clipper bladeset is provided and generally designated 20. As known in the art, the bladeset 20 is attached to a hair clipper 22 including a housing 24 having a generally elongate handle 26. As is well known in the art, the housing 24 generally encloses, among other things an electric motor, a drive system, electronic circuitry, and an optional rechargeable battery (all not shown).

As seen in FIG. 1, the bladeset 20 includes at least one stationary blade 28 having a plurality of stationary blade teeth 30 defining stationary blade teeth cavities or spaces 32 between adjacent teeth, and at least one moving blade 34 having a plurality of moving blade teeth 36 defining moving blade teeth cavities or spaces 38 between adjacent teeth. The stationary blade 28 is connected to the housing 24 by any suitable fastening technology, such as screws or the like (not shown). The moving blade 32 is configured for laterally reciprocating relative to the stationary blade 28 for cutting hair therebetween in a scissors action, as is well known in the art. Suitable hair clipper bladeset assemblies are disclosed in U.S. Pat. Nos. 5,068,966; 9,545,729 and 10,272,578, the contents of all of which are herein incorporated by reference. To enable hair cutting, the moving blade teeth 36 further include sides or cutting faces that overlap corresponding stationary blade teeth sides or cutting faces during reciprocation, creating a scissors action and cutting hair that has entered the stationary blade teeth cavities 32.

Referring to FIGS. 2, 3, 4A, and 4B, an embodiment of a blade 40 used for the moving blade 34 of the bladeset 20 is shown, however it is contemplated that the present tooth configuration is adaptable for the stationary blade 28 as well, where the blade 40 includes a plurality of long teeth 42 and a plurality of short teeth 44 extending along a width "W" (FIG. 4A) of the blade 40. Each of the long teeth 42 and the short teeth 44 extend from a base 46 of the blade 40 and include a first cutting face 48 and a second cutting face 50. The long teeth 42 extend from the base 46 by a first distance D1, and the short teeth 44 extend from the base by a second distance D2 which is smaller than the first distance. In the illustrated embodiment, the base 46 is generally a straight, flat edge from which the teeth 42, 44 extend. It is contemplated, however, that the base 46 is optionally a curved edge from which the teeth extend.

The first and second cutting faces 48, 50 of the long teeth 42 and the short teeth 44 extend transversely from the base 46. Each of the long teeth 42 and the short teeth 44 include a tip 52, which optionally is flat as illustrated and is oriented at an angle parallel to the base 46.

Figure 4B:
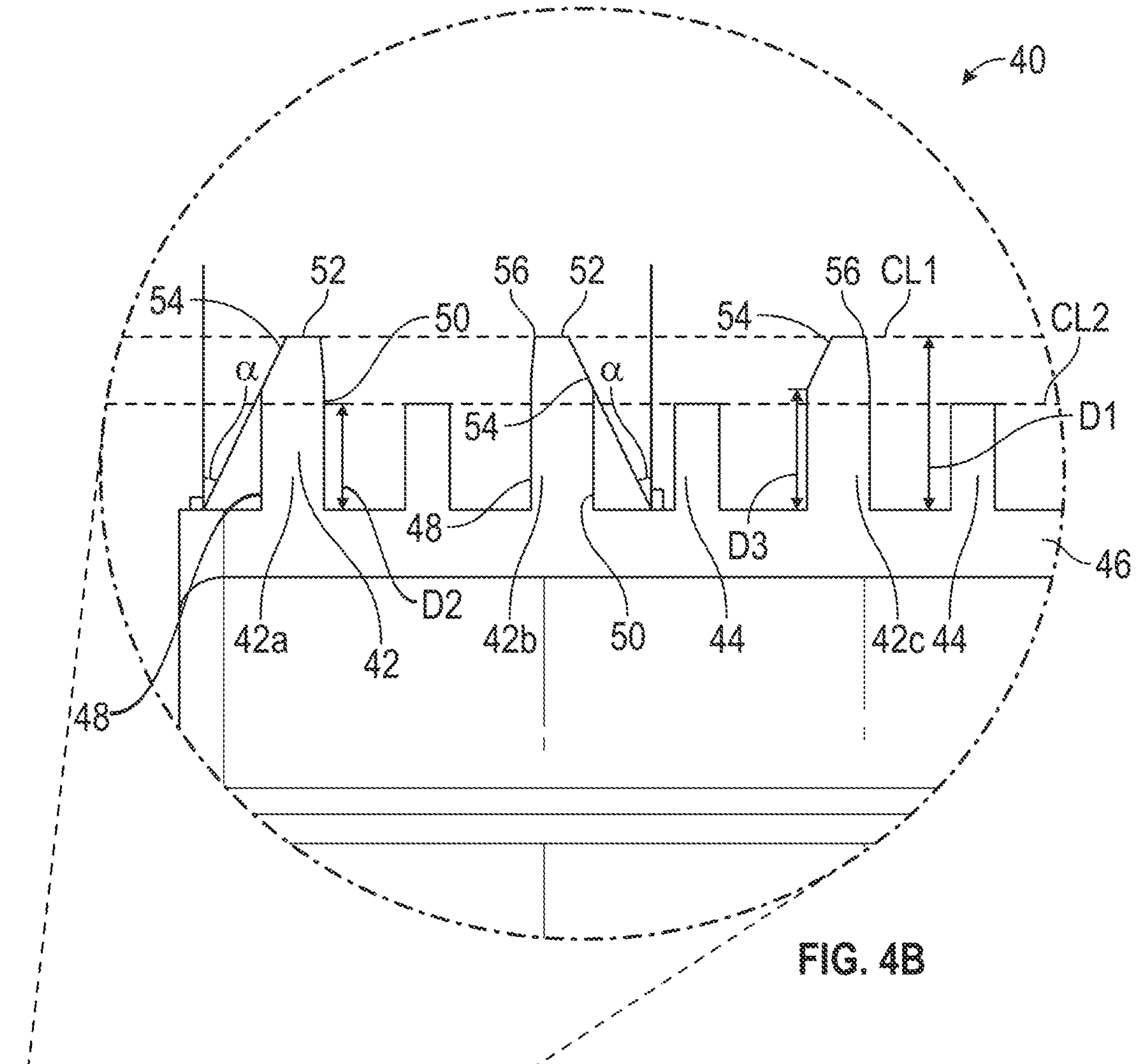
FIG. 4B is an enlarged, fragmentary view of the blade of FIG. 4A.
Figure 4A:
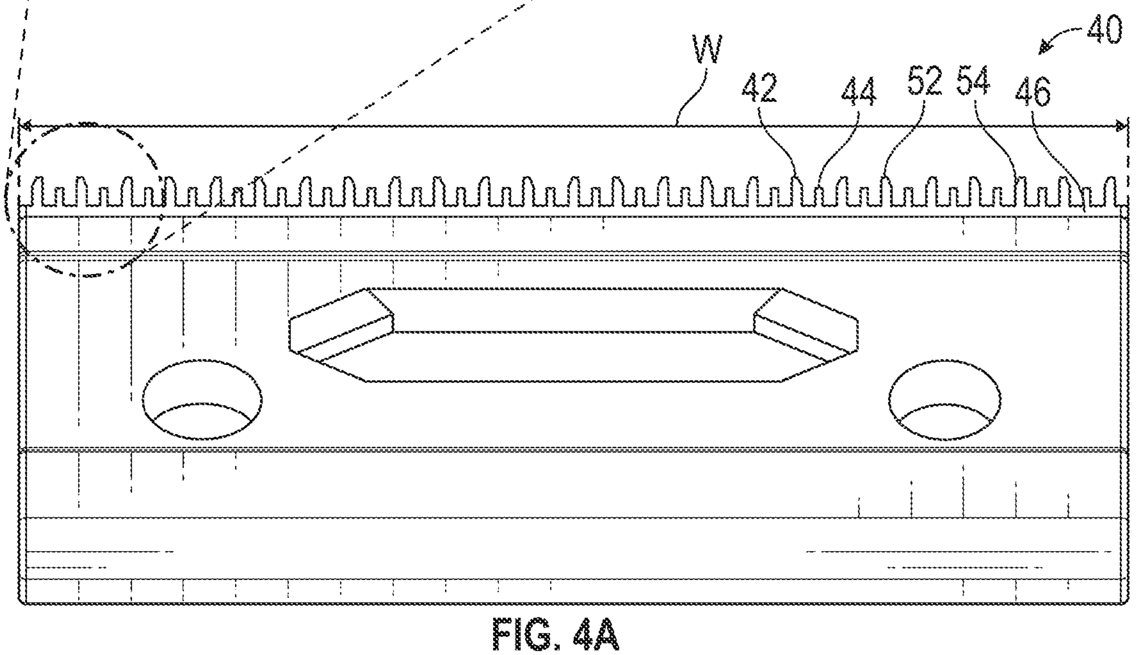
FIG. 4A is a perspective view of the blade of FIG. 2.
Figure 5:
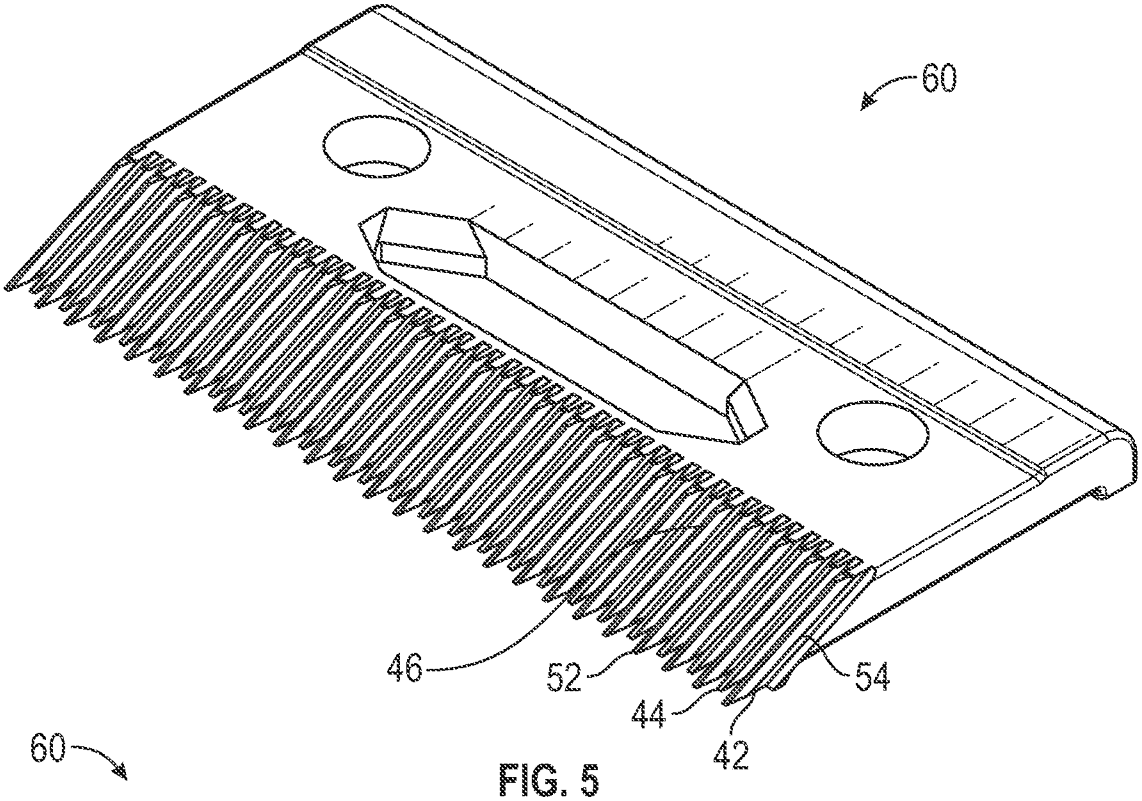
FIG. 5 is a top perspective view of another embodiment of the blade of the present bladeset.
Figure 6:
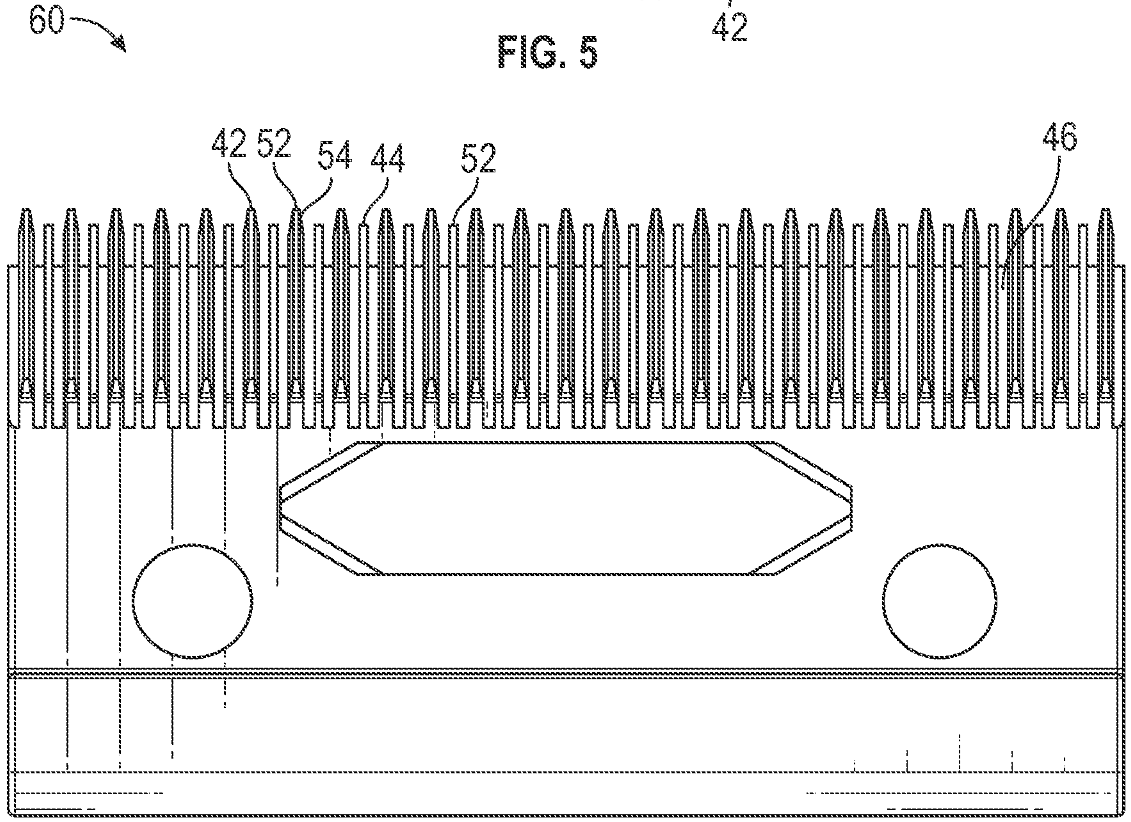
FIG. 6 is a top view of the blade of FIG. 5.

As seen in FIG. 4B, a first long tooth 42*a* includes a first tapered edge 54 between the tip 52 and the first cutting face 48. Similarly, a second long tooth 42*b* includes the first tapered edge 54 between the tip 52 and the second cutting face 50. In this manner, the blade 40 optionally includes the first and second long teeth 42*a*, 42*b* that alternate which of the first and second cutting faces 48, 50 includes the first tapered edge 54.

In the present embodiment of the blade 40, the first long tooth 42*a* of the blade does not include the tapered edge 54 between the tip 52 and the second cutting face 50. Instead, the tip 52 and the second cutting face 50 form a perpendicular edge 56. Similarly, the second long tooth 42*b* of the blade 40 does not include the tapered edge 54 between the tip 52 and the first cutting face 48. The tips 52 of the long teeth 42 are preferably parallel and form a first cutting line CL1 which is parallel to the width "W" of the blade 40. Likewise, the tips 52 of the short teeth 44 are preferably parallel and form a second cutting line CL2 which is also parallel to the width "W" of the blade 40.

Referring to FIG. 4B, the first long tooth 42*a* includes the tapered edge 54 along the first cutting face 48. The second cutting face 50 includes the perpendicular edge 56. Conversely, the second long tooth 42*b* includes the tapered edge 54 on the second cutting face 50. In this way, the first tapered edges 54 of the first and second long teeth 42*a*, 42*b* face away from one another. Between the first and second long teeth 42*a*, 42*b* is a short tooth 44.

A third long tooth 42*c* has a similar configuration as the long tooth 42*a*, such that the tapered edges of long teeth 42*b*, 42*c* face one another. There is also a short tooth 44 between the long teeth 42*b*, 42*c*.

The first tapered edges 54 extend at an angle α from the first or second cutting face 48, 50, where the angle α is measured between a straight line extending perpendicularly from the base 46 and the first tapered edge. Preferably, the angle α is between 5 degrees and 25 degrees. In the present embodiment of the blade 40, the short teeth 44 include perpendicular edges 56 between the tip 54 and the first and second cutting faces 48, 50.

In another preferred embodiment of the present blade 40, the second distance D2, which corresponds to the height of the short teeth 44, is at least large enough so that the short teeth extend beyond the base 46 a distance greater than a distance D3 between the bottom of the first tapered edge 54 and the base.

FIGS. 5, 6, 7A and 7B show another embodiment of a blade 60 used for the stationary blade 28 and/or the moving blade 32 of the bladeset 20. Components shared with the blade 40 are designated with identical reference numbers. The blade 60 is identical to the blade 40, with the exception that each of the first and second cutting faces 48, 50 of the long teeth 42 include the first tapered edge 54. As with the embodiment of FIGS. 2, 3, 4A, and 4B, the short teeth 44 are disposed between adjacent long teeth 42.

Figure 7B:
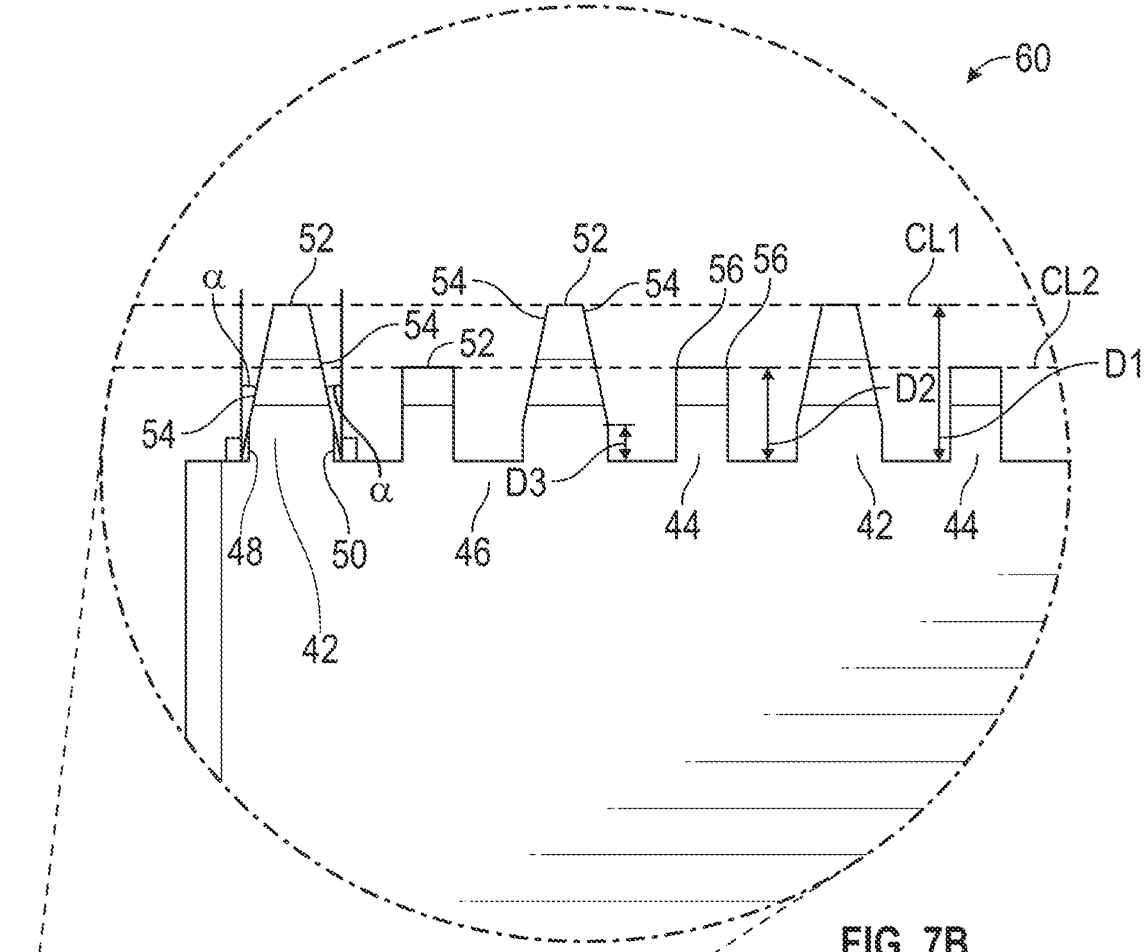
FIG. 7B is an enlarged, fragmentary view of the blade of FIG. 7A.
Figure 7A:
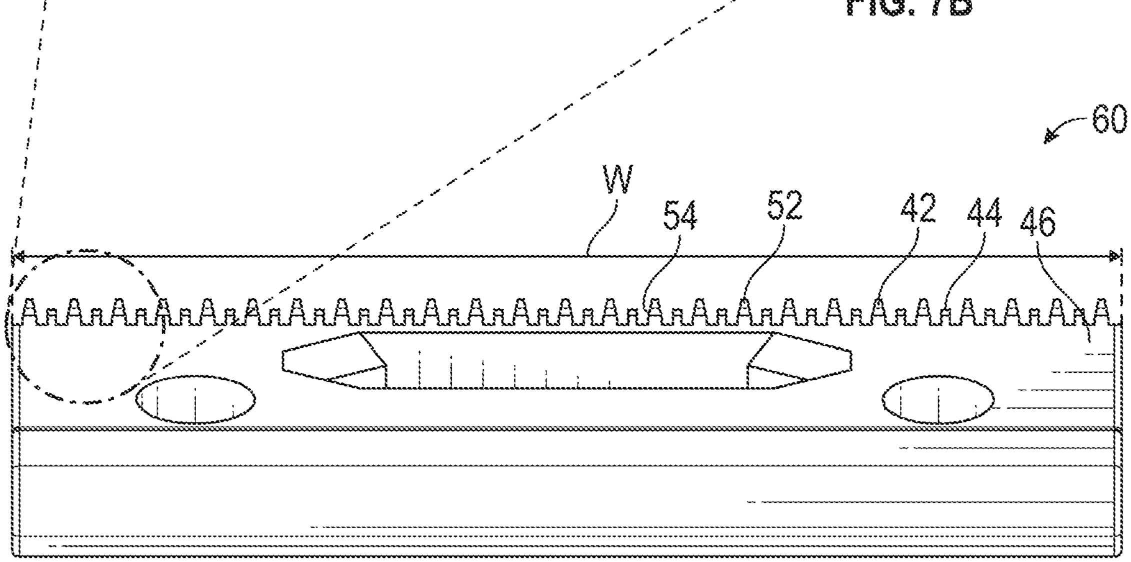
FIG. 7A is a perspective view of the blade of FIG. 5.
Figure 8:
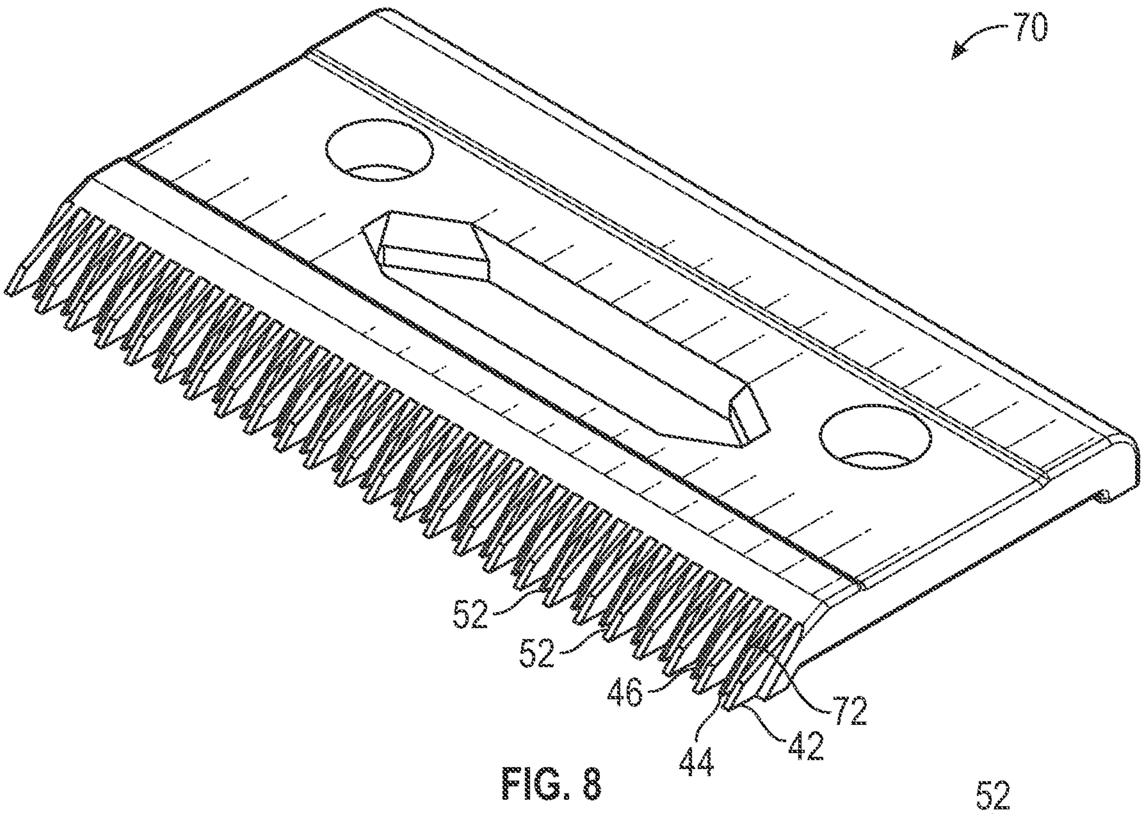
FIG. 8 is a top perspective view of a further embodiment of the blade of the present bladeset.
Figure 9:
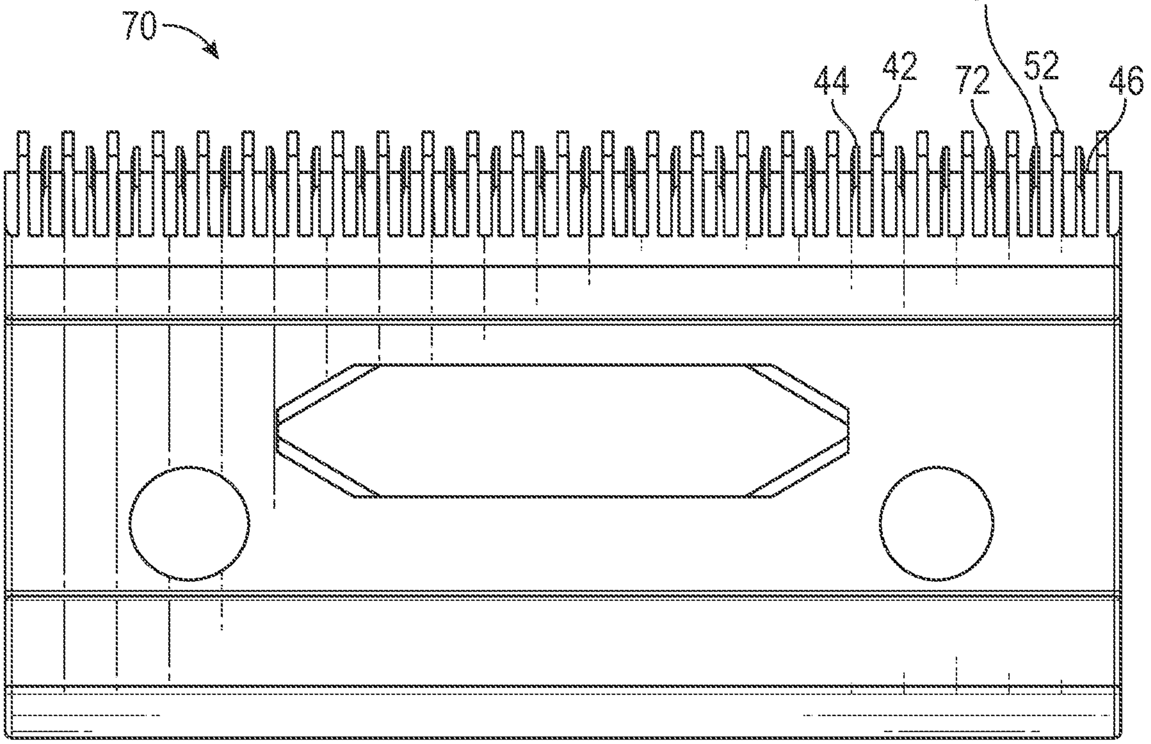
FIG. 9 is a top view of the blade of FIG. 8.
Figure 10B:
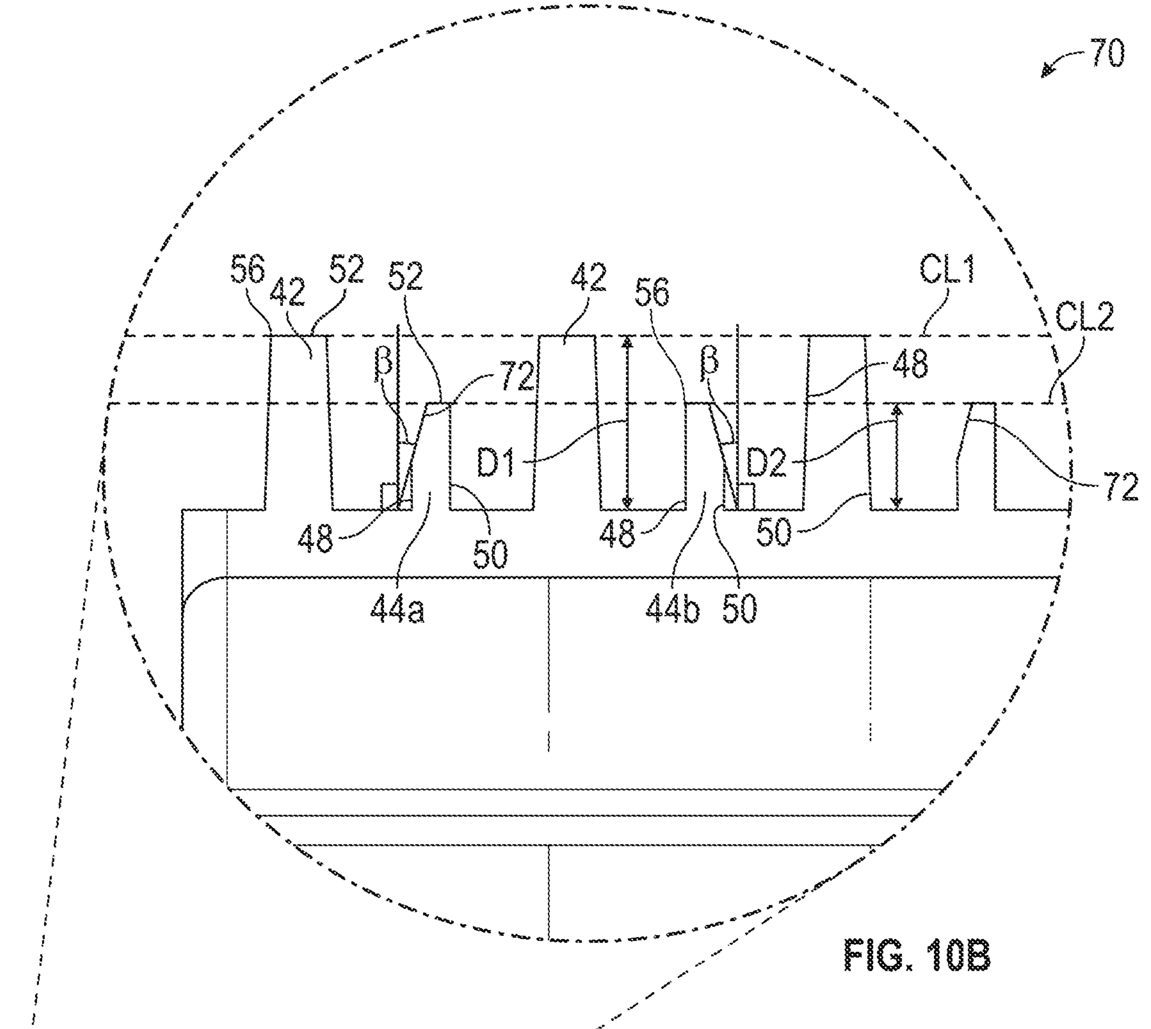
FIG. 10B is an enlarged, fragmentary view of the blade of FIG. 10A.
Figure 10A:
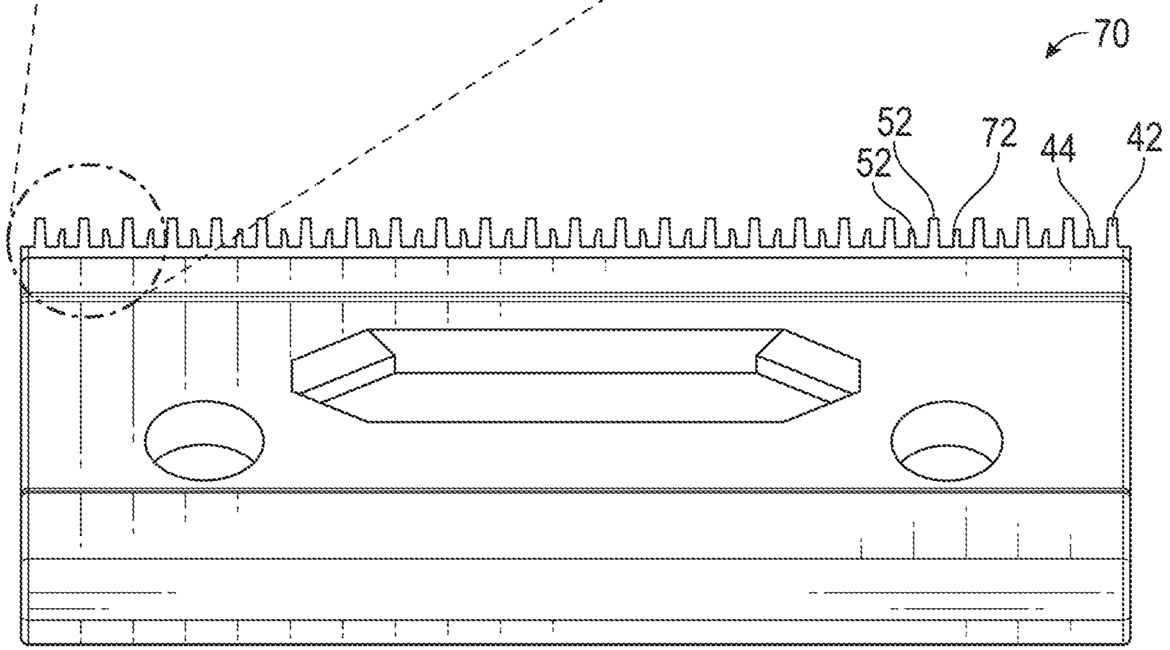
FIG. 10A is a perspective view of the blade of FIG. 8.
Figure 11:
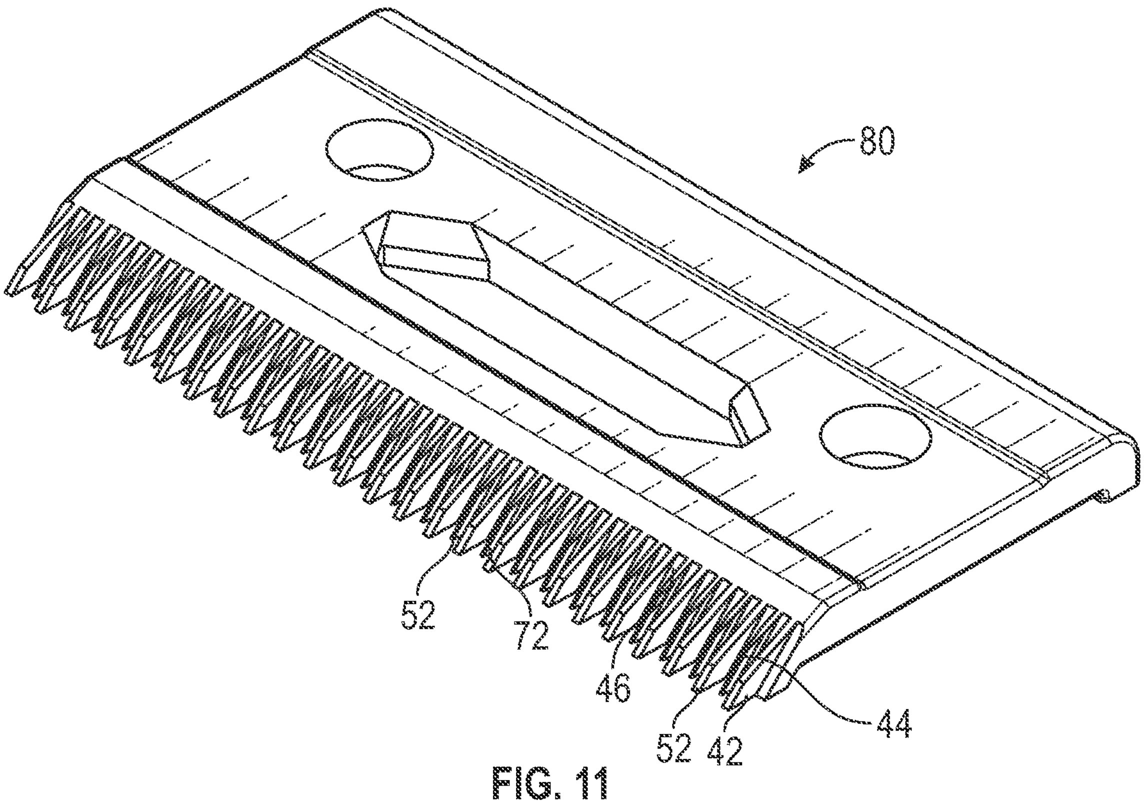
FIG. 11 is a top perspective view of yet another embodiment of the blade of the present bladeset.
Figure 12:
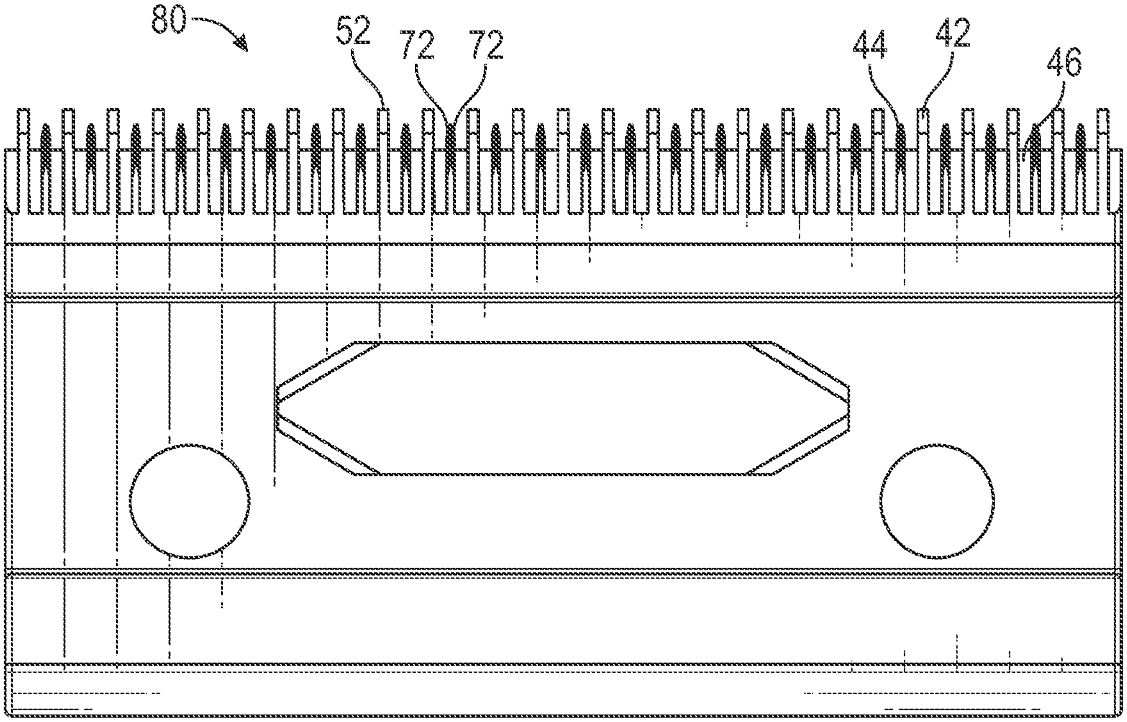
FIG. 12 is a top view of the blade of FIG. 11.
Figure 13B:
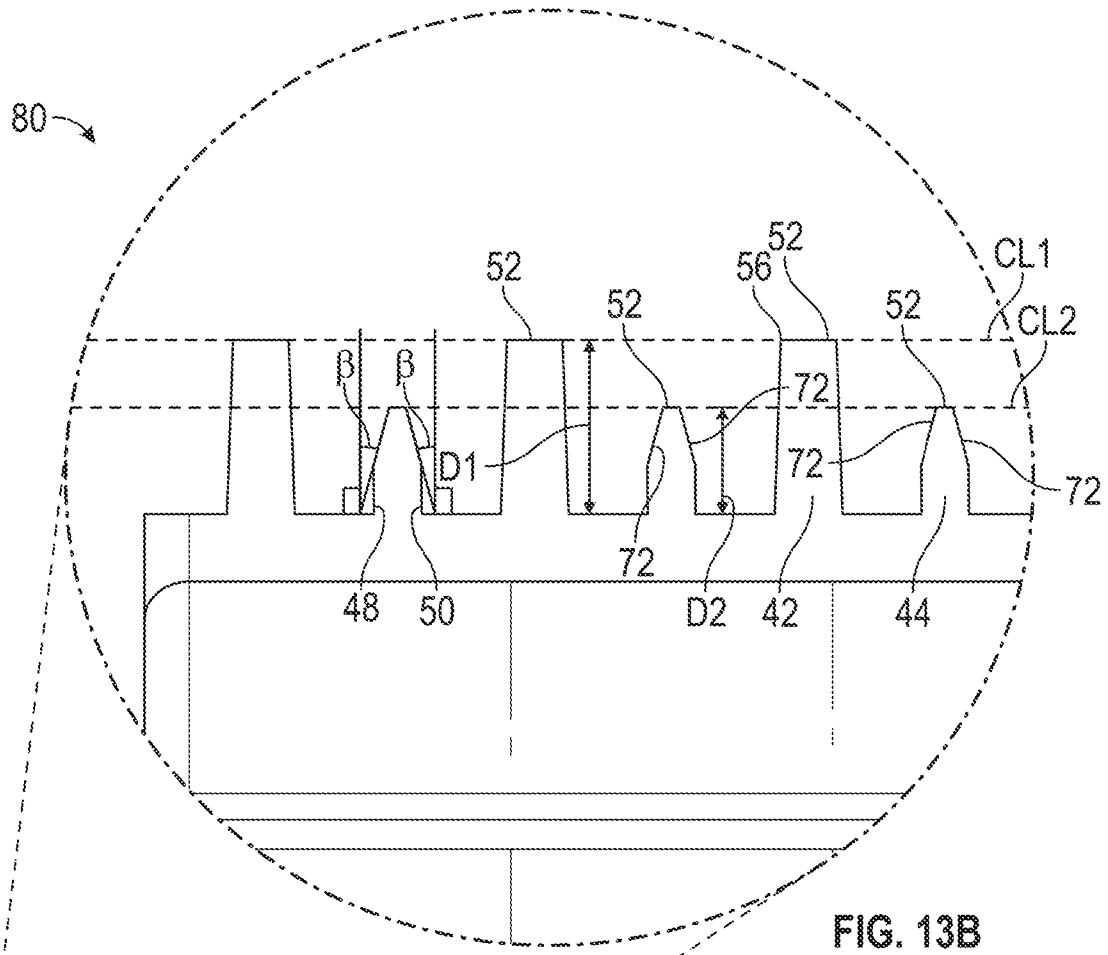
FIG. 13B is an enlarged, fragmentary view of the blade of FIG. 13A.
Figure 13A:
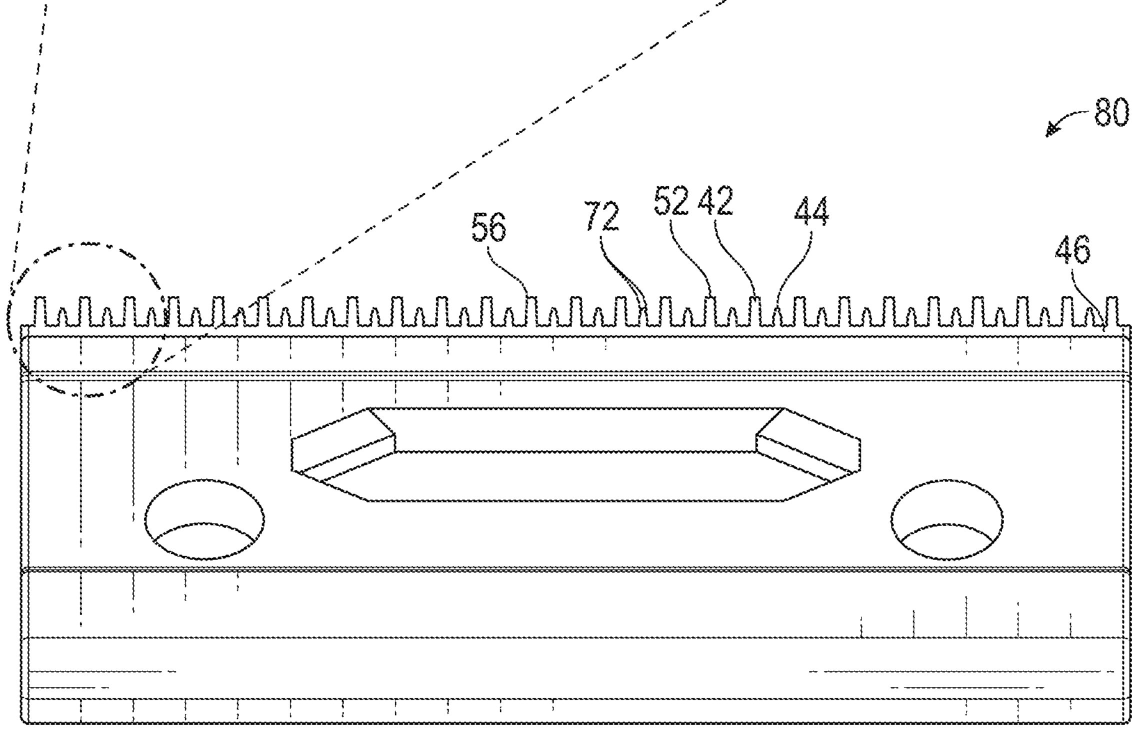
FIG. 13A is a perspective view of the blade of FIG. 11.

FIGS. 8, 9, 10A and 10B show another embodiment of a blade 70 used for the stationary blade 28 and/or the moving blade 32 of the bladeset 20. Components shared with the blade 40 are designated with identical reference numbers. In the present embodiment of the blade 70, the long teeth 42 include the perpendicular edges 56 between the tip 54 and the first and second cutting faces 48, 50. As seen in FIG. 7B, a first short tooth 44*a* includes a second tapered edge 72 between the tip 52 and the first cutting face 48. Similarly, a second short tooth 44*b* includes the second tapered edge 72 between the tip 52 and the second cutting face 50. In this manner, the blade 70 optionally includes first and second short teeth 44*a*, 44*b* that alternate which of the first and second cutting faces 48, 50 includes the second tapered edge 72.

In the present embodiment of the blade 70, the first short tooth 44*a* of the blade does not include the second tapered edge 72 between the tip 52 and the second cutting face 50. Instead, the tip 52 and the second cutting face 50 form the perpendicular edge 56. Similarly, the second short tooth 44*b* of the blade 70 does not include the second tapered edge 72 between the tip 52 and the first cutting face 48.

The second tapered edge 72 extends at an angle β from the first or second cutting face 48, 50, where the angle β is measured between a straight line extending perpendicularly from base 46 and the second tapered edge. Preferably, the angle β is between 5 degrees and 25 degrees.

FIGS. 11, 12, 13A, and 13B show another embodiment of a blade 80 used for the stationary blade 28 and/or the moving blade 32 of the bladeset 20. Components shared with the blade 70 are designated with identical reference numbers. The blade 80 is identical to the blade 70, with the exception that each of the first and second cutting faces 48, 50 of the short teeth 44 include the second tapered edge 72.

While particular embodiments of the present bladeset with tapered teeth have been described herein, it will be appreciated by those skilled in the art that changes and modifications may be made thereto without departing from the invention in its broader aspects and as set forth in the following claims.

The invention claimed is:

1. A bladeset operationally connected to a hair clipper, the bladeset comprising:

a stationary blade and a moving blade configured for reciprocating laterally relative to said stationary blade;

at least one of said stationary blade and said moving blade including a base and a plurality of teeth extending from said base, said plurality of teeth comprising:

a set of long teeth, each of said long teeth having a tip parallel to and spaced a first distance from said base defining a first cutting line;

a set of short teeth, each of said short teeth having a tip parallel to and spaced a second distance from said base defining a second cutting line spaced apart from said first cutting line, wherein said first cutting line is farther from said base than said second cutting line, and wherein:

each of said long teeth includes first and second cutting faces with a first segment which extends transversely from said base, and wherein one of said first and second cutting faces of said long teeth includes a second segment with a first tapered edge having a first end at said tip of said long teeth and a second end at said first segment, and said first segment of the other of said first and second cutting faces extends along an entire length of said second cutting face, such that consecutive long teeth of said set of said long teeth alternate which of said first cutting face and said second cutting face of said long teeth include said first tapered edge, and each of said short teeth includes a first cutting face and a second cutting face, said first and second cutting faces of each of said short teeth being parallel to one another; or each of said short teeth includes first and second cutting faces with a first segment which extends transversely from said base, and wherein one of said first and second cutting faces of said short teeth includes a second segment with a second tapered edge having a first end at said tip of said short teeth and a second end at said first segment, and said first segment of the other of said first and second cutting faces extends along an entire length of said second cutting face, such that consecutive short teeth of said set of said short teeth alternate which of said first cutting face and said second cutting face of said short teeth include said first tapered edge, and each of said long teeth includes a first cutting face and a second cutting face, said first and second cutting faces of each of said long teeth being parallel to one another.

2. The bladeset of claim 1, wherein said long teeth include said one of said first and second cutting faces with said second segment, and wherein said second distance is larger than a length of said first segment of said one of said first and second cutting faces which includes said second segment between said base and said second end of said second segment.

3. The bladeset of claim 1, wherein said first tapered edge extends at an angle α from said at least one of said first cutting face and said second cutting face of said long teeth, wherein said angle α is measured between a straight line extending perpendicularly from said base and said first tapered edge, and wherein said angle α is between 5 degrees and 25 degrees.

4. The bladeset of claim 1, wherein said second tapered edge extends at an angle β from said at least one of said first cutting face and said second cutting face of said short teeth, wherein said angle β is measured between a straight line extending perpendicularly from said base and said second tapered edge, and wherein said angle β is between 5 degrees and 25 degrees.

5. The bladeset of claim 1, wherein said long teeth include said one of said first and second cutting faces with said second segment, and wherein said second distance is smaller than a length of said first segment of said one of said first and second cutting faces which includes said second segment between said base and said second end of said second segment.

6. A hair clipper comprising:

a clipper housing defining a longitudinal axis and a cutting end; and a clipper bladeset operationally connected to said cutting end and including a stationary blade and a moving blade configured for reciprocating laterally relative to said stationary blade;

at least one of said stationary blade and said moving blade including a base and a plurality of teeth extending from said base, said plurality of teeth comprising:

a set of long teeth, each of said long teeth having a tip parallel to and spaced a first distance from said base defining a first cutting line; and a set of short teeth, each of said short teeth having a tip parallel to and spaced a second distance from said base defining a second cutting line spaced apart from said first cutting line, wherein said first cutting line is farther from said base than said second cutting line, wherein:

each of said long teeth includes a first cutting face and a second cutting face with a first segment which extends transversely from said base, and wherein one of said first and second cutting faces of said long teeth includes a second segment with a first tapered edge having a first end at said tip and a second end at said first segment which extends transversely from said base, and said first segment of the other of said first and second cutting faces extends along an entire length of said second cutting face, such that consecutive long teeth of said set of said long teeth alternate which of said first cutting face and said second cutting face of said long teeth include said first tapered edge, and each of said short teeth includes a first cutting face and a second cutting face, said first and second cutting faces of each of said short teeth being parallel to one another; or each of said short teeth includes a first cutting face and a second cutting face with a first segment which extends transversely from said base, and wherein one of said first and second cutting faces of said short teeth includes a second segment with a second tapered edge having a first end at said tip and a second end at said first segment which extends transversely from said base, and said first segment of the other of said first and second cutting faces extends along an entire length of said second cutting face, such that consecutive short teeth of said set of said short teeth alternate which of said first cutting face and said second cutting face of said short teeth include said first tapered edge, and each of said long teeth includes a first cutting face and a second cutting face, said first and second cutting faces of each of said long teeth being parallel to one another.

7. The hair clipper of claim 6, wherein said first cutting face and said second cutting face of said long teeth each include said first tapered edge.

8. The hair clipper of claim 6, wherein said first tapered edge extends at an angle α from said at least one of said first cutting face and said second cutting face of said long teeth, wherein said angle α is measured between a straight line extending perpendicularly from said base and said first tapered edge, and wherein said angle α is between 5 degrees and 25 degrees.

9. The hair clipper of claim 6, wherein said first cutting face and said second cutting face of said short teeth each include said second tapered edge.

10. The hair clipper of claim 6, wherein said second tapered edge extends at an angle β from said at least one of said first cutting face and said second cutting face of said short teeth, wherein said angle β is measured between a straight line extending perpendicularly from said base and said second tapered edge, and wherein said angle β is between 5 degrees and 25 degrees.

11. The hair clipper of claim 6, wherein said long teeth include said one of said first and second cutting faces with said second segment, and wherein said second distance is larger than a length of said first segment of said one of said first and second cutting faces which includes said second segment between said base and said second end of said second segment.

12. The hair clipper of claim 6, wherein said long teeth include said one of said first and second cutting faces with said second segment, and wherein said second distance is smaller than a length of said first segment of said one of said first and second cutting faces which includes said second segment between said base and said second end of said second segment.

* * * * *